United States Patent
Dandekar et al.

(10) Patent No.: US 9,850,165 B2
(45) Date of Patent: Dec. 26, 2017

(54) COATED FIBRE AND CONCRETE COMPOSITION COMPRISING THE SAME

(71) Applicant: Dow Corning Corporation, Midland, MI (US)

(72) Inventors: Deepak Vijay Dandekar, Mumbai (IN); Vivek Prabhakar Raje, Maharashtra (IN); Milind Vaidya, Thane (IN)

(73) Assignee: DOW CORNING INDIA PRIVATE LIMITED, Mumbai (IN)

( * ) Notice: Subject to any disclaimer, the term of this patent is extended or adjusted under 35 U.S.C. 154(b) by 0 days.

(21) Appl. No.: 14/914,827

(22) PCT Filed: Aug. 29, 2014

(86) PCT No.: PCT/US2014/053376
§ 371 (c)(1),
(2) Date: Feb. 26, 2016

(87) PCT Pub. No.: WO2015/031737
PCT Pub. Date: Mar. 5, 2015

(65) Prior Publication Data
US 2016/0214894 A1 Jul. 28, 2016

(30) Foreign Application Priority Data

Aug. 29, 2013 (IN) .................. 2830/MUM/2013

(51) Int. Cl.
| | |
|---|---|
| C04B 16/06 | (2006.01) |
| D06M 15/643 | (2006.01) |
| B32B 27/12 | (2006.01) |
| B32B 27/28 | (2006.01) |
| C04B 20/10 | (2006.01) |
| D06M 13/513 | (2006.01) |
| D06M 15/647 | (2006.01) |
| C04B 28/02 | (2006.01) |
| C09D 183/04 | (2006.01) |
| D06M 101/32 | (2006.01) |

(52) U.S. Cl.
CPC .......... *C04B 16/0683* (2013.01); *B32B 27/12* (2013.01); *B32B 27/283* (2013.01); *C04B 20/1033* (2013.01); *C04B 20/1051* (2013.01); *C04B 28/02* (2013.01); *C09D 183/04* (2013.01); *D06M 13/513* (2013.01); *D06M 15/643* (2013.01); *D06M 15/647* (2013.01); *D06M 2101/32* (2013.01); *D06M 2200/50* (2013.01); *D06M 2400/01* (2013.01)

(58) Field of Classification Search
CPC ............................ B32B 27/12; B32B 27/283
USPC ................................... 428/402, 407
See application file for complete search history.

(56) References Cited

U.S. PATENT DOCUMENTS

| | | | |
|---|---|---|---|
| 3,620,823 A | 11/1971 | Smith | |
| 3,767,488 A * | 10/1973 | Seals ................ | C06B 45/18 102/401 |
| 4,757,121 A * | 7/1988 | Tanaka .............. | C08K 5/00 252/8.63 |
| 5,232,611 A * | 8/1993 | Ohashi .............. | D06M 15/643 252/8.61 |
| 8,449,666 B2 * | 5/2013 | Rautschek .......... | C04B 41/4922 106/287.11 |

FOREIGN PATENT DOCUMENTS

| | | |
|---|---|---|
| CN | 102619091 A | 8/2012 |
| JP | H 03-150242 A | 6/1991 |
| JP | H 05-132345 | 5/1993 |
| JP | 09-279480 A * | 10/1997 |
| WO | WO 02/28795 A2 | 4/2002 |
| WO | WO 2004/028994 A2 | 4/2004 |

OTHER PUBLICATIONS

Machine-generated translation of JP 09-279480 into English (no date).*
International Search Report for Application No. PCT/US2014/053376 dated Nov. 24, 2014, 4 pages.
English language abstract and machine-assisted English translation for CN 102619091 extracted from espacenet.com database on Mar. 7, 2016, 14 pages.
English language abstract and machine-assisted English translation for JPH 03-150242 extracted from espacenet.com database on Mar. 7, 2016, 4 pages.
English language abstract and machine-assisted English translation for JPH 05-132345 extracted from espacenet.com database on Mar. 7, 2016, 9 pages.

* cited by examiner

*Primary Examiner* — Marc Zimmer
(74) *Attorney, Agent, or Firm* — Howard & Howard Attorneys PLLC

(57) ABSTRACT

A coated fiber comprising a fiber comprising polyester, and a coating on the fiber, said coating comprising a cross-linked silicone prepared by cross-linking on the fiber one or more silicon-containing compounds selected from an organosilane and organosilicone resin, wherein at least one of said silicon-containing compounds has at least three cross-linking groups is provided, together with a method of preparing such a fiber, a concrete composition comprising such coated fibers, and a method of preparing such a concrete composition.

18 Claims, No Drawings

COATED FIBRE AND CONCRETE COMPOSITION COMPRISING THE SAME

RELATED APPLICATIONS

This application is the National Stage of International Patent Application No. PCT/US2014/053376, filed on Aug. 29, 2014, which claims priority to and all the advantages of Indian Patent Application No. 2830/MUM/2013, filed on Aug. 29, 2013, the content of which is incorporated herein by reference.

FIELD OF THE INVENTION

The present invention relates to a coated fibre, and in particular a polyester fibre coated with a cross-linked silicone and a method of preparing such a fibre. The coated fibre of the invention can be uniformly dispersed in concrete. The invention further relates to a concrete composition comprising such coated fibres, and a method of preparing such a concrete composition. The concrete composition of the invention exhibits improved flexural strength.

BACKGROUND

Concrete is an ubiquitous construction material comprising aggregates, cement and optional further components. Although concrete has a high compressive strength, it typically has lower tensile and flexural strengths. In order to improve the tensile and flexural strengths, reinforcements such as bars and fibres may be added.

Polyester fibres have many beneficial properties which render them an attractive candidate for concrete reinforcements. They are strong, resistant to stretching and shrinking, chemically resistant, resilient when wet and dry, mildew resistant and abrasion resistant.

Fibre reinforced cement compositions comprising an inorganic cementitious matrix having fibres, such as polyester fibres, embedded therein are known.

Polyester fibres can exhibit poor dispersion in concrete, producing non-homogenous reinforced concrete compositions. Furthermore, the polyester fibres can show poor bonding with the other components of the concrete, resulting in a less than desirable flexural strength.

SUMMARY OF THE INVENTION

In a first aspect, the present invention provides a coated fibre comprising:
  a fibre comprising polyester, and
  a coating on the fibre, said coating comprising a cross-linked silicone prepared by cross-linking on the fibre one or more silicon-containing compounds selected from an organosilane and organosilicone resin, wherein at least one of said silicon-containing compounds has at least three cross-linking groups.

In one embodiment, the cross-linking groups are independently selected from hydrogen directly bonded to silicon, hydroxyl, acrylate, acyl, acyloxy, alkenyl, alkoxy, epoxy, amine, mercapto and methacrylate.

In another embodiment, the one or more silicon-containing compounds having at least three cross-linking groups may comprise an organosilane of general formula (1):

$$R_{(4-a)}Si(R^1X)_a \tag{1}$$

wherein X is a cross-linking group as already defined, $R^1$ is a covalent bond or a divalent organic linking group, R is a substituted or unsubstituted organic radical, and a is 3 or 4.

In a further embodiment the one or more silicon-containing compounds having at least three cross-linking groups may comprise an organosilicone resin. The organosilicone resin may be a silsesquioxane resin comprising one or more structural units of general formula (2):

$$(R^3SiO_{(3-b)/2}(R^2X)_b) \tag{2}$$

wherein $R^3$ is independently a substituted or unsubstituted organic radical; $R^2$ is a covalent bond or a divalent organic linking group, X is a cross-linking group as defined above and b is independently 0, 1 or 2 with the proviso that the silsesquioxane resin comprises at least 3 cross-linking groups X. Preferably, the silsesquioxane resin has on average 3 cross-linking groups per molecule.

In another embodiment, the cross-linking of the silicon-containing compounds may be carried out in the presence of a silicone polyether.

In a further embodiment, the cross-linked silicone of the coating may comprise unreacted cross-linking groups.

In another embodiment, the coating on the fibre comprises from 0.1 to 1.0 wt. % of the uncoated fibre.

In a second aspect, the present invention provides a method of preparing a coated fibre, said method comprising at least the steps of:
  applying a coating composition in a liquid to a fibre comprising polyester, said coating composition comprising one or more silicon-containing compounds selected from organosilane and organosilicone resin, wherein at least one of said silicon-containing compounds has at least three cross-linking groups, and
  cross-linking the coating composition on the fibre comprising polyester to provide the coated fibre.

In one embodiment, the step of applying a coating composition may comprise at least the steps of:
  mixing the fibre comprising polyester with the coating composition in the liquid,
  removing a portion of the liquid from the fibre comprising polyester to provide a fibre comprising polyester coated with the coating composition.

In another embodiment, the step of applying a coating composition may comprise spraying the coating composition in liquid onto the fibre comprising polyester.

In a further embodiment, the fibre comprising polyester may be a plurality of fibres comprising polyester. In such an embodiment, the second aspect of the invention may further comprise the step of separating the fibres comprising polyester coated with the coating composition before the cross-linking step.

In a third aspect, the present invention provides a concrete composition comprising:
  a coated fibre according to the first aspect;
  cement;
  water;
  aggregate; and
  optionally one or more of plasticizers, accelerators and air entraining agents.

In a fourth aspect, the present invention provides a method of preparing a concrete composition comprising at least the steps of:
  mixing of a coated fibre according to the first aspect with one or both of cement and aggregate to provide a mixture;
  optionally adding aggregate or cement if either of these components are not present in the mixture;
  adding water to the mixture;
  setting the mixture.

In another embodiment, the method of the fourth aspect may further comprise one or more of the steps of:
- adding plasticizer prior to the addition of the aggregates;
- adding air entraining agents prior to the setting the mixture.

In a fifth aspect, the present invention provides the use of a composition comprising one or more silicon-containing compounds selected from organosilane and organosilicone resin, wherein at least one of said silicon-containing compounds has at least three cross-linking groups in a liquid as a fibre coating agent.

In one embodiment of the fifth aspect, the composition in the liquid used as a fibre coating agent is an emulsion.

In another embodiment of the fifth aspect, the fibre is a fibre comprising polyester.

In a sixth aspect, the present invention provides a cement composition comprising:
- a coated fibre according to the first aspect;
- cement;
- optionally one or more of water, aggregate, plasticizers, accelerators and air entraining agents.

In one embodiment of the sixth aspect, the cement composition comprises water.

DETAILED DESCRIPTION OF THE INVENTION

The coated fibre which is useful as a reinforcement for concrete comprises a fibre and a coating on the fibre. The fibre comprises polyester. In one embodiment the fibre may consist of polyester, such that the fibre is a polyester fibre.

The fibre may comprise one or more of the polyesters selected from polyalkylene terephthalate such as polyethylene terephthalate, polybutylene terephthalate or polytrimethylene terephthalate; polyethylene naphthalate, polyethylene adipate, polyhydroxylalkanoate, polyhydroxyl butyrate, poly(3-hydroxybutyrate-co-3-hydroxyvalerate), polyglycolide, polylactic acid, the polycondensation product of 4-hydroxybenzoic acid and 6-hydroxynaphthalene-2-carboxylic acid (Vectran®) and polycaprolactone.

Polyester fibres are available as staple commercial products. Polyester fibres can be prepared by methods known in the art, such as polycondensation or copolymerisation, for instance of dicarboxylic acids and diols or hydroxy carboxylic acids, or the ring-opening of the corresponding cyclic structure, such as a lactide or caprolactone.

The cross-section of the fibre may have any shape, such as circular, elliptical or lobed, for instance bi-lobed or tri-lobed. As used herein, the cross-section is the section of the fibre in the plane perpendicular to its longest axis. Typically the fibre cross-section has a circular shape.

The fibre may be a continuous strand, or may be chopped. When chopped, the fibre may have an average length along its longest axis in the range of from 5 mm to 100 mm. When the fibre has a circular cross-section, it may have a diameter in the range of 5 microns to 100 microns. Preferably the fibre has an aspect ratio (length/diameter) in the range of 50 to 20000.

The coating on the fibre comprises a cross-linked silicone. The cross-linked silicone may be a cross-linked organopolysiloxane. The cross-linked silicone is prepared by cross-linking one or more silicon-containing compounds selected from organosilane and organosilicone resin. At least one of the silicon-containing compounds has at least three cross-linking groups. Utilising one or both of an organosilane and organosilicone resin having at least three cross-linking groups provides an extensively cross-linked, three dimensional coating on the fibre. Such three dimensional coatings exhibit good mechanical strength.

In one embodiment, one or more intermediate coatings may be present between the polyester fibre and the coating comprising a cross-linked silicone. However, it is preferred that the coating comprising the cross-linked silicone is in direct contact with an outer surface of the polyester fibre. Thus, in another embodiment, there is no intermediate coating between the fibre and the cross-linked silicone coating. This is advantageous because the cross-linked silicone coating can form a strong bond to the polyester fibre. Without wishing to be bound by theory, it is thought that a portion of the cross-linking groups of the silicon-containing compound can form a covalent bond with the polyester during coating formation by cross-linking, thereby attaching the coating to the fibre.

The coating comprising a cross-linked silicone can form the external surface of the coated fibre. When this coating forms the outer surface of the coated fibre, it imparts improved handling properties. For instance, the dispersion of the coated fibres in liquids such as aqueous solutions or viscous mixtures such as pastes is improved.

The coating comprising a cross-linked silicone is prepared by cross-linking on the fibre one or more silicon-containing compounds. At least one cross-linking group should be present on each of the one or more silicon-containing compounds taking part in the cross-linking reaction. As used herein, the term "cross-linking group" means a reactive group capable of taking part in a cross-linking reaction. Thus, the organosilane of the one or more silicon-containing compounds should have at least one cross-linking group. Similarly, the organosilicone resin of the one or more silicon-containing compounds should have at least one cross-linking group. However, at least one of the silicon-containing compounds taking part in the cross-linking reaction should have at least three cross-linking groups in order to provide a highly cross-linked three dimensional coating.

Preferably the cross-linking groups are also capable of forming bonds with the polyester of the fibre.

The cross-linking group may be independently selected from one or more of hydrogen directly bonded to silicon, hydroxyl, acrylate, acyl, acyloxy, alkenyl, alkoxy, epoxy, amine, mercapto and methacrylate. The hydroxyl, acrylate, acyl, alkenyl, alkoxy, epoxy, amine, mercapto and methacrylate groups may be directly bonded to silicon.

The cross-linking groups should be capable of cross-linking via a cross-linking reaction. The cross-linking reaction producing the cross-linked silicone comprising the coating may be a condensation reaction, a hydrosilylation reaction, or a substitution reaction. For instance, hydrolysable cross-linking groups such as hydrogen directly bonded to silicon, acyl, acyloxy and alkoxy groups may be converted to hydroxyl groups which may then undergo condensation reactions. When the cross-linking groups comprise hydrogen directly bonded to silicon and a carbon-carbon double bond, such as an alkenyl, acrylate or methacrylate, the cross-linking may be by hydrosilylation. A catalyst, such as platinum containing compound may be present in the coating composition to facilitate hydrosilylation. When the cross-linking groups comprise an amine and an epoxy group, the cross-linking may be by nucleophilic substitution.

Preferred cross-linking groups include hydrogen directly bonded to silicon, hydroxyl, $C_{1-6}$ alkoxy, $C_{1-6}$ acyl and $C_{1-6}$ acyloxy groups, such as $C_{1-5}$ alkyl-C(O)—O— groups. It is preferred that such cross-linking groups are directly bonded to silicon.

Alternatively, a divalent linking organic group $R^1$, $R^2$ may be present to link the cross-linking group to the organosilane or organosilicone resin. The divalent organic group may be independently selected from alkylene having from one to five carbon atoms, a divalent aryl group having from four to ten carbon atoms in the ring(s) structure and a divalent alkylaryl group having from one to five carbon atoms in the alkyl moiety and from four to ten atoms in the aryl ring(s) structure. The aryl group may comprise from one to three heteroatoms in the aryl ring(s) structure. The heteroatoms may be selected from O, N and S. The alkylene, divalent aryl group and divalent alkylaryl group each may be independently substituted or unsubstituted. If substituted, one or more hydrogen atoms present may be replaced with a cross-linking group as defined above, such that more than one cross-linking group is directly bonded to the divalent organic group. For instance, the divalent organic group and cross-linking groups together may be a melamine radical. Alternatively, one or more hydrogen atoms present may be independently replaced with a halogen atom, such as a fluorine or chlorine atom.

At least three cross-linking groups are present on at least one of the silicon-containing compounds. In this way, a structured, three dimensional coating comprising cross-linked silicone is provided. In contrast, should less than three cross-linking groups be present on a silicon-containing compound, such compounds could only form part of a molecular chain, and not three dimensional networks, upon crosslinking.

An organosilane can be used in the cross-linking reaction to form the cross-linked silicone of the coating. The organosilane may be used alone, a mixture of organosilanes may be used, or the organosilane or organosilanes may be used in combination with other silicon-containing compounds such as the organosilicone resin discussed below. When used alone or in combination with other silicon-containing containing compounds which do not have at least three cross-linking groups, the organosilane should contain at least three cross-linking groups. Furthermore, other compounds, such as silicone polyethers may also be present during cross-linking.

The organosilane may be a compound of general formula (1):

$$R_{(4-a)}Si(R^1X)_a \qquad (1)$$

wherein each X is independently a cross-linking group as already defined, $R^1$ is a covalent bond or a divalent organic linking group discussed above, R is a substituted or unsubstituted organic radical, and a is 3 or 4.

The group R is preferably an alkyl having from one to ten, more preferably from one to five, carbon atoms, an alkenyl group having from two to ten, more preferably from two to five, carbon atoms, an aryl group having from four to ten carbon atoms in the ring(s) structure and an alkylaryl group having from one to five carbon atoms in the alkyl moiety and from four to ten atoms in the aryl ring(s) structure. The aryl group may comprise from one to three heteroatoms in the aryl ring(s) structure. The heteroatoms may be selected from O, N and S.

The organic radical R may be substituted or unsubstituted. Thus, the alkyl, alkenyl, aryl and alkylaryl groups forming R each may be independently substituted or unsubstituted. If substituted, one or more hydrogen atoms may be replaced by halogen atom such as a fluoro or chloro substituent.

Typically, the $R^1$ is a covalent bond, the cross-linking group X is hydroxyl or a hydrolysable group such as hydrogen directly bonded to silicon, acyl, acyloxy or alkoxy and the group R is alkyl having from one to ten carbon atoms or $Ph(CH_2)_r$— in which Ph is a phenyl group and r is 0, 1, 2, 3 or 4. Preferred acyl and acyloxy groups of the cross-linking group X are those having from one to five carbon atoms, including the carbonyl group. Preferred alkoxy groups for the cross-linking group X are those having from one to five carbon atoms, with methoxy and ethoxy being most preferred. Preferred alkyl groups for the group R are methyl, ethyl and n-octyl. In one embodiment, the organosilane is n-octyltriethoxysilane.

An organosilicone resin can be used in the cross-linking reaction to form the cross-linked silicone. The organosilicone resin may be used alone, a mixture of organosilicone resins may be used, or the organosilicone resin or resins may be used in combination with other silicon-containing compounds such as the organosilane. When used alone or in combination with other silicon-containing compounds which do not have at least three cross-linking groups, the organosilicone resin should contain at least three cross-linking groups. Furthermore, other compounds, such as silicone polyethers may also be present during cross-linking. An organosilicone resin may be defined by one or more of the four possible monomer units M, D, T and Q. The organosilicone resin used herein may comprise one or more resins selected from the group MT, DT, MQ, MDT, MTQ and QDT.

In one embodiment, the organosilicone resin may comprise from 0.2 to 10 percent by weight cross-linking group X. Preferably, the organosilicone resin comprises from 1 to 5 percent by weight cross-linking group X, such as hydroxyl groups directly bonded to silicon. In another embodiment the organosilicone resin comprises a hydroxylated MDT silicone resin having 0.5 percent by weight hydroxyl groups and composed of 62 percent by weight $CH_3SiO_{3/2}$, 24 percent by weight $(CH_3)_2SiO_{2/2}$ and 14 percent by weight $(CH_3)_3SiO_{1/2}$.

It is preferred that the organosilicone resin is a silsesquioxane resin. The silsesquioxane resin may comprise one or more structural units of general formula (2):

$$(R^3SiO_{(3-b)/2}(R^2X)_b) \qquad (2)$$

wherein $R^3$ is independently selected from a substituted or unsubstituted organic radical, $R^2$ is a covalent bond or a divalent organic linking group as defined above and X is a cross-linking group as defined above and b is 0, 1 or 2 with the proviso that the silsesquioxane resin comprises at least 3 cross-linking groups.

In one embodiment the silsesquioxane resin comprises at least three structural units of general formula (2) in which b is 1. In another embodiment, the silsesquioxane resin comprises at least one structural unit of general formula (2) in which b is 1 and at least one structural unit of general formula (2) in which b is 2.

The substituted or unsubstituted organic radical group $R^3$ is preferably an alkyl having from one to ten, more preferably from one to five, carbon atoms, an alkenyl group having from two to ten, more preferably from two to five, carbon atoms, an aryl group having from four to ten carbon atoms in the ring(s) structure and an alkylaryl group having from one to five carbon atoms in the alkyl moiety and from four to ten atoms in the aryl ring(s) structure. The aryl group may comprise from one to three heteroatoms in the aryl ring(s) structure. The heteroatoms may be selected from O, N and S.

The organic radical $R^3$ may be substituted or unsubstituted. Thus, the alkyl, alkenyl, aryl and alkylaryl groups forming $R^3$ each may be independently substituted or unsubstituted. If substituted, one or more hydrogen atoms present may be replaced one or more hydrogen atoms may be replaced by halogen atom such as a fluoro or chloro substituent.

Typically, $R^2$ is a covalent bond, the cross-linking group X is hydroxyl or a hydrolysable group such as hydrogen directly bonded to silicon, acyl, acyloxy or alkoxy and the group R is alkyl having from one to five carbon atoms or $Ph(CH_2)_r$— in which Ph is a phenyl group and r is 0, 1, 2, 3 or 4. Preferred acyl and acyloxy groups of the cross-linking group X are those having from one to five carbon atoms, including the carbonyl group. Preferred alkoxy groups of the cross-linking group X are those having from one to five carbon atoms, with methoxy and ethoxy being most preferred. Preferred $R^3$ groups are methyl and benzyl.

In one embodiment the silsesquioxane resin comprises one of more of the group of ethoxy terminated n-octylsilsesquioxane resin, hydroxyl terminated n-octylsilsesquioxane resin, and hydroxyl terminated methyl silsesquioxane resin and trimethyl siloxy terminated aminopropyl phenyl silsesquioxane resin.

Further silicon-containing compounds may also be present as the one or more silicon-containing compounds which take part in the cross-linking reaction. For instance, one or both of an organosilane and organosilicone resin having less than three cross-linking groups may be present. It is preferred that such an organosilane and organosilicone resin have two cross-linking groups. The organosilane and organosilicone may be as previously described, with the distinction that only one or two cross-linking groups are present on each compound. For instance an organosilane of general formula (1) in which a is 1 or 2 and/or an organosilicone resin comprising one or more structural units of general formula (2) having only one or two cross-linking groups X in the resin may be present. Such silicon-containing compounds are disclosed as general formulae (3) and (4) below.

Thus, the one or more silicon-containing compounds may further comprise an organosilane of general formula (3):

$$R_{(4-c)}Si(R^1X)_c \quad (3)$$

wherein X is a cross-linking group as already defined, $R^1$ is a covalent bond or a divalent organic linking group, R is a substituted or unsubstituted organic radical, and c is 2. Preferred definitions of the groups X, $R^1$ and R are the same as those for the organosilane of general formula (1) above.

The one or more silicon-containing compounds may further comprise a silsesquioxane resin comprising one or more structural units of formula (4):

$$(R^3SiO_{(3-d)/2}(R^2X)_d) \quad (4)$$

wherein $R^3$ is independently a substituted or unsubstituted organic radical; $R^2$ is a covalent bond or a divalent organic linking group, X is a cross-linking group as defined above and d is 0, 1 or 2 with the proviso that the silsesquioxane resin comprises 2 cross-linking groups X. Preferred definitions of the groups X, $R^2$ and $R^3$ are the same as those for the organosilane of general formula (2) above.

In one embodiment the silsesquioxane resin comprises two structural units of general formula (2) in which b is 1. In another embodiment, the silsesquioxane resin comprises one structural unit of general formula (2) in which b is 1.

It is preferred that the coating comprises unreacted cross-linking groups. Such groups may improve the properties of the coated fibre. In particular, when the coated fibre is used as a reinforcement in composite materials, such as reinforced concrete, the coated fibre exhibits improved bonding compared to an uncoated fibre.

The coating comprising the cross-linked silicone on the fibre may comprise at least 0.05 wt. % of the uncoated fibre, and may alternatively be in the range of from 0.05 to 10 wt. %, alternatively from 0.05 to 2.0 wt. % of the uncoated fibre.

The coated fibre may be prepared by a method comprising at least the steps of:
  applying a coating composition in a liquid to a fibre comprising polyester, said coating composition comprising one or more silicon-containing compounds selected from organosilane and organosilicone resin, wherein at least one of said silicon-containing compounds has at least three cross-linking groups,
  cross-linking the coating composition on the fibre comprising polyester to provide the coated fibre.

The fibre comprising polyester is discussed above. In one embodiment, the fibre comprising polyester is a plurality of fibres comprising polyester, such as chopped fibres.

The coating composition comprises one or more silicon-containing compounds as discussed above. The coating composition may further comprise additional compounds. The additional compounds may or may not take part in the cross-linking reaction. Examples of such additional compounds include independently compatibility agents, such as an emulsifier, and a catalyst for the cross-linking reaction.

The coating composition is provided in a liquid. The coating composition may be dissolved or dispersed in the liquid, such that it may be applied as a solution or a dispersion, such as an emulsion. The emulsion may be a water in oil, or an oil in water emulsion.

The liquid may comprise water or an organic liquid. When the liquid is an organic liquid, the coating composition is typically present as a solution in the liquid. Preferred organic liquids are alkanols such as methanol and ethanol, aromatic liquids such as toluene and xylene, alkanes such as hexanes, heptanes and octanes, cycloalkanes such as cyclopentane, cyclohexane, cyclobutane, cycloparaffins, liquid hydrocarbon mixtures such as petroleum ether and silicone oils such as dialkylpolysiloxane, particularly dimethylpolysiloxane. When the liquid comprises water, the coating composition may be present as a dispersion, such as an oil in water emulsion or a water in oil emulsion. Compatibility agents such as emulsifiers may be present to stabilise the coating composition in the liquid. Silicone polyethers are one class of suitable emulsifier.

The coating composition in the liquid may be applied to the fibre by any suitable method. In one embodiment, the fibre is mixed with the coating composition in the liquid. This can be achieved by immersing the fibre in the coating composition in the liquid. The mixture of fibre, coating composition and liquid may be agitated, such as stirred. Subsequently, a portion of the liquid can be removed from the surface of the fibre to provide a fibre coated with the coating composition. For instance, the coating composition, liquid and fibre may be filtered to separate the fibre having the coating composition on its surface from the liquid.

When the fibre comprising polyester is a plurality of fibres comprising polyester, the fibres may be separated after the removal of a portion of the liquid. This separation step ensures that the coating compositions on the surface of different fibres do not bond to one another in the cross-linking step.

Alternatively, the coating composition in the liquid can be applied to the fibre by spraying.

Once the coating composition has been applied to the fibre, the coating composition can be cross-linked to provide the coated fibre.

The cross-linking reaction may be carried out at ambient temperature, or higher than ambient temperature, for instance in the range of form ambient temperature to 150° C., preferably at a temperature in the range of from 40 to 150° C., more preferably at a temperature in the range of from 50 to 70° C. The cross-linking reaction may be a curing reaction.

The coating of the fibre may be carried out as part of a fibre manufacture, for instance during fibre finishing or as a separate process, which may be carried out at a different location from fibre manufacture.

There is further provided the use of a composition comprising one or more silicon-containing compounds selected from organosilane and organosilicone resin, wherein at least one of said silicon-containing compounds has at least three cross-linking groups in a liquid as a fibre coating agent. The composition in the liquid may be an emulsion. When the liquid is water, the composition in the liquid may be an oil in water emulsion and may further comprise an emulsifier. It is preferred that the use of the composition is as a fibre coating agent for a fibre comprising polyester.

The coated fibres disclosed herein are useful as reinforcements in a concrete composition. A concrete composition is provided comprising:
  a coated fibre as previously disclosed;
    cement;
    water;
    aggregate; and
    optionally one or more of plasticizers, accelerators and air entraining agents.

The coated fibres used as a reinforcement in concrete may have a diameter in the range of from 3 micrometers to 100 micrometers. The coated fibres may have a length in the range of from 5 mm to 100 mm. The coated fibre may be present in a range of from 0.05 to 20% by weight of the total weight of cement, water and coated fibre. In one embodiment, the coated fibre is a plurality of fibres comprising polyester, such as chopped fibres.

The surface of uncoated fibre comprising polyester is generally unreactive, such that good compatibility and bonding with the components of a concrete composition is difficult to achieve. Furthermore, it is difficult to achieve a homogeneous dispersion of polyester fibres in a concrete composition, resulting in the floating or sinking or cluttering together of polyester fibres at the concrete surface or bottom or within concrete composition. This lowers the effectiveness of polyester fibres as a reinforcement, as well as providing a finished concrete which is aesthetically unappealing.

In contrast, the coated fibres disclosed herein can have a better compatibility with the other components of concrete compositions as exhibited by improved dispersion of the fibres. The coated fibres can also have improved bonding in concrete compositions, as exhibited by increased flexural strength. Flexural or bend strength, is a material's ability to resist deformation under load.

As used herein, the term "cement" refers to an inorganic binder material which hardens in the presence of water as a result of hydration. Non-exhaustive examples of cements include Portland cement, phosphate cement, high alumina cements, high gypsum cements, gypsum-free cements and combinations thereof.

Aggregate is a particulate material which provides bulk to the concrete. It should be resistant to compressive stress and may have a variety of sizes. Examples of aggregates used in concrete include sand, gravel, crushed stone, slag and crushed concrete. Cement may be used as a binder for aggregates to form a concrete. When mixed with water, the cement hydrates to form crystal lattices which lock the aggregate into a rigid structure.

It will be apparent that when the aggregate comprises sand, the concrete composition provided may be used as a reinforced mortar composition.

Plasticizer such as sulphonated naphthalene, melamine-formaldehyde condensates, sulphonated melamine-formaldehyde condensates, modified ligno sulphonates and polymeric additives such as acrylate based latexes, disperse the solids in composition, particularly at low water/cement ratios, and may optionally be present in the concrete composition.

Accelerators such as calcium nitrate and sodium nitrate increase the rate of hydration of the cement and therefore the setting time of the concrete composition, and may optionally be present in the concrete composition.

Air entraining agents such as hydrolysed protein and keratin compounds, sodium isopropyl naphthalene sulphonate, petroleum naphthalene sulphate, sodium secondary alkyl sulphate, saponin, sodium alkyl aryl sulphate and stabilised saponified rosin and resin compounds, introduce air bubbles into the concreter composition prior to hardening in order to improve durability and may also be optionally present in the concrete composition.

The concrete composition may be prepared by a method comprising at least the steps of:
  mixing of a coated fibre as previously disclosed herein with one or both of cement and aggregate to provide a mixture;
  optionally adding aggregate or cement if either of these components are not present in the mixture;
  adding water to the mixture;
  setting the mixture.

The coated fibre is discussed above. In one embodiment, the coated fibre is a plurality of coated fibres comprising polyester, such as chopped fibres.

The coated fibre may be mixed with both cement and aggregate or the coated fibre may first be mixed with cement and aggregate may be subsequently added to the mixture or the coated fibre may first be mixed with aggregate and cement may be subsequently added to the mixture.

The method may further comprise the step of adding plasticizer prior to the addition of the aggregates.

The method may further comprise the step of adding air entraining agents, typically with mixing, prior to the step of setting the mixture.

In another embodiment, the method may comprise:
  mixing a coated fibre as previously disclosed herein with water to provide a dispersion of the coated fibre in water;
  adding cement to said dispersion to form a paste;
  adding aggregates to the paste to provide a mixture;
  adding further water to the mixture;
  setting the mixture.

In an alternative embodiment, the concrete composition may be prepared by a method comprising at least the steps of:
  forming a concrete mixture comprising cement, water and aggregates; and
  adding a coated fibre as previously disclosed herein to the concrete mixture.

In one embodiment, the coated fibre can be added to the concrete mixture as a dispersion of the coated fibre in water.

The step of adding the coated fibre to the concrete mixture may be accompanied by mixing.

In an alternative embodiment, the step of adding a coated fibre to the mixture may comprise:
  providing a continuous coated fibre;
  cutting the coated fibre to provide chopped coated fibre; such that the coated fibre added to the concrete mixture is chopped coated fibre.

A cement composition or use in the manufacture of a concrete composition may be provided. The cement composition may comprise:
  a coated fibre as previously disclosed herein;
  cement; and
  optionally one or more of water, aggregate, plasticizers, accelerators and air entraining agents.

It may be advantageous to provide the cement composition without water. Thus, the cement composition may comprise a coated fibre as previously disclosed herein, cement and optionally one or more of aggregate, plasticizers, accelerators and air entraining agents. This provides a pre-mixed cement composition for use in the manufacture of concrete. Such a cement composition can be easily transported. As will be apparent, the addition of water to the cement composition will start the hydrating reaction leading to the setting of the cement.

It may also be advantageous to provide the cement composition without aggregate. Thus, the cement composition may comprise a coated fibre as previously disclosed herein, cement and optionally water.

Embodiments of the invention will be better understood by reference to the following examples which are presented by way of illustration and are not meant to be limiting.

EXAMPLES

The following experimental examples describe the preparation of a number of cross-linked silicone coatings on polyester fibres. The weight of the coating was determined with respect to the uncoated fibre using an analytical balance. The coatings were characterised by IR spectroscopy. The coated fibres were incorporated into cement compositions and the flexural strength of such compositions were measured over a period of 28 days.

Cement compositions comprising the coated fibres were found to exhibit improved flexural strength at 7 and 28 days since maturation, compared to corresponding cement compositions comprising either no polyester fibres or uncoated polyester fibres.

Infrared Spectroscopy

The uncoated and coated fibres were analysed by infrared spectroscopy using a Thermo Electron spectrometer Model Nicolet 5700 in the wavelength range of 400 to 4000 nm. The presence of an organosilicone coating on the fibre was confirmed by observation of peaks at 1000-1110 cm$^{-1}$ indicative of Si—OR groups and peaks at 1240-1260 cm$^{-1}$ indicative of Si—CH$_3$ groups.

Flexural Strength Testing

The flexural strength of cement bars were tested at 7 and 28 days after maturation using an AIMIL Triaxial Compression Machine using proving ring 0.75.

Example 1 (Fibre Coating Comprising Cross-Linked Organosilane from Emulsion)

10 ml of an emulsion of n-octyltriethoxy silane with ethoxy and hydroxyl terminated n-octylsilsesquioxane resin and silicone polyethers (Dow Corning) was taken in a 1000 ml beaker and diluted using 90 ml water. 2 gm of washed dry polyester fibres (locally purchased) were added to the solution and stirred well using a magnetic stirrer. Fibres were separated by filtration and dried and the coating on the fibre was cured at 80° C. for 1 hr in an oven.

The coating on fibre was determined as 0.4% w/w with respect to the uncoated fibre weight. The presence of organosilicone in the coating was confirmed by IR spectroscopy.

The coated fibres were then used as reinforcement in cement bars of typical size of 25 cm×2.5 cm×2.5 cm, made from cement and water (67:34 wt. ratio) in which fibres were typically reinforced at 1% weight to cement weight. The cement used was Portland cement.

Two types of control samples were prepared. The first control was a similarly dimensioned cement bar comprising no reinforcement while the second control was a cement bar comprising non-coated washed and dried polyester fibres as reinforcement.

The flexural strength of cement bars were tested at $7^{th}$ day maturation and $28^{th}$ day maturation. The cement bars comprising coated fibres gave 25% and 23% improvement in flexural strength compared to non reinforced cement bars at $7^{th}$ day maturation and $28^{th}$ day maturation respectively. The cement bars comprising coated fibres gave 24% and 24% improvement in flexural strength compared to non coated polyester fibre reinforced cement bars at $7^{th}$ day maturation and $28^{th}$ day maturation respectively.

Example 2 (Fibre Coating Comprising Cross-Linked Organosilane from Solution)

10 ml of n-octyltriethoxy silane (Dow Corning) was taken in a 1000 ml beaker and diluted using 90 ml methanol (Merck). 2 gm of washed dry polyester fibres (locally purchased) were added to the solution and stirred well using a magnetic stirrer. Fibres were separated by filtration, dried and the coating on the fibre cured at 60° C. for 1 hr in an oven.

The coating on fibre was determined as 0.1% w/w with respect to the uncoated fibre weight. The presence of organosilicone in the coating was confirmed by IR spectroscopy.

The coated fibres were then used as reinforcement in cement bars as described in Example 1. The cement bars comprising coated fibres gave 15% and 15% improvement in flexural strength compared to non reinforced bars at $7^{th}$ day maturation and $28^{th}$ day maturation respectively. The cement bars comprising coated fibres gave 15% and 15% improvement in flexural strength compared to non coated fibre reinforced bars at $7^{th}$ day maturation and $28^{th}$ day maturation respectively.

Example 3 (Fibre Coating Comprising Cross-Linked Organosilane Mixture)

5 ml each of n-octyltriethoxy silane (Dow Corning) and methyltriethoxy silane (Dow Corning) was taken in a 1000 ml beaker and diluted using 90 ml methanol (Merck). 2 gm of washed dry polyester fibres (locally purchased) were added to the solution and stirred well using a magnetic stirrer. Fibres were separated by filtration and dried and the coating on the fibre was cured at 60° C. for 1 hr in an oven.

The coating on fibre was determined as 0.3% w/w with respect to the uncoated fibre weight. The presence of organosilicone in the coating was confirmed by IR spectroscopy.

The coated fibres were then used as reinforcement in cement bars as described in Example 1. The cement bars comprising coated fibres gave 10% and 12% improvement in flexural strength compared to non reinforced bars at $7^{th}$ day maturation and 28$^{th}$ day maturation respectively. Also the cement bars comprising coated fibres gave 11% and 12% improvement in flexural strength compared to non coated fibre reinforced bars at 7$^{th}$ day maturation and 28$^{th}$ day maturation respectively.

Example 4 (Fibre Coating Comprising Cross-Linked Organosilicone Resin)

10 ml of hydroxyl terminated methyl silsesquioxane resin (Dow Corning) was taken in a 1000 ml beaker and diluted using 90 ml methanol (Merck). 2 gm of washed dry polyester fibres (locally purchased) were added to the solution and stirred well using a magnetic stirrer. Fibres were separated by filtration and dried and the coating on the fibre was cured at 60° C. for 1 hr in an oven.

The coating on fibre was determined as 0.4% w/w with respect to the uncoated fibre weight. The presence of organosilicone in the coating was confirmed by IR spectroscopy.

The coated fibres were then used as reinforcement in cement bars as described in Example 1. The cement bars comprising coated fibres gave 8% and 8% improvement in flexural strength compared to non reinforced bars at 7$^{th}$ day maturation and 28$^{th}$ day maturation respectively. Also the cement bars comprising coated fibres gave 8% and 8% improvement in flexural strength compared to non coated fibre reinforced bars at 7$^{th}$ day maturation and 28$^{th}$ day maturation respectively.

Example 5 (Fibre Coating Comprising Cross-Linked Organosilicone Resin Mixture)

5 ml each of hydroxyl terminated methyl silsesquioxane resin (Dow Corning) and trimethyl siloxy terminated aminopropyl phenyl silsesquioxane resin (Dow Corning) were taken in a 1000 ml beaker and diluted using 90 ml methanol (Merck). 2 gm of washed dry polyester fibres (locally purchased) were added to the solution and stirred well using magnetic stirrer. Fibres were separated by filtration and dried and the coating on the fibre was cured at 60° C. for 1 hr in an oven.

The coating on fibre was determined as 0.8% w/w with respect to the uncoated fibre weight. The presence of organosilicone in the coating was confirmed by IR spectroscopy.

The coated fibres were then used as reinforcement in cement bars as described in Example 1. The cement bars comprising coated fibres gave 16% and 17% improvement in flexural strength compared to non reinforced bars at 7$^{th}$ day maturation and 28$^{th}$ day maturation respectively. Also the cement bars comprising coated fibres gave 15% and 17% improvement in flexural strength compared to non coated fibre reinforced bars at 7$^{th}$ day maturation and 28$^{th}$ day maturation respectively.

Example 6 (Fibre Coating Comprising Cross-Linked Organosilane and Organosilicone Resin Mixture)

5 ml each of n-octyltriethoxy silane (Dow Corning) and hydroxyl terminated methyl silsesquioxane resin (Dow Corning) was taken in a 1000 ml beaker and diluted using 90 ml methanol (Merck). 2 gm of washed dry polyester fibres (locally purchased) were added to the solution and stirred well using magnetic stirrer. Fibres were separated by filtration and dried and the coating on the fibre was cured at 60° C. for 1 hr in an oven.

The coating on fibre was determined as 0.8% w/w with respect to the uncoated fibre weight. The presence of organosilicone in the coating was confirmed by IR spectroscopy.

The coated fibres were then used as reinforcement in cement bars as described in Example 1. The cement bars comprising coated fibres gave 20% and 21% improvement in flexural strength compared to non reinforced bars at 7$^{th}$ day maturation and 28$^{th}$ day maturation respectively. Also the cement bars comprising coated fibres gave 20% and 21% improvement in flexural strength compared to non coated fibre reinforced bars at 7$^{th}$ day maturation and 28$^{th}$ day maturation respectively.

Example 7 (Fibre Coating Comprising Cross-Linked Organosilane and Organosilicone Resin Mixture)

5 ml each of n-octyltriethoxy silane (Dow Corning) and hydroxyl terminated methyl silsesquioxane resin (Dow Corning) was taken in a 1000 ml beaker. To this 1 gm of polyethylene oxide mono lauryl ether was added and diluted using water 89 ml to form an emulsion. 2 gm of washed dry polyester fibres (locally purchased) were added to the solution and stirred well using magnetic stirrer. Fibres were separated by filtration and dried and the coating on the fibre was cured at 80° C. for 1 hr in an oven.

The coating on fibre was determined as 0.4% w/w with respect to the uncoated fibre weight. The presence of organosilicone in the coating was confirmed by IR spectroscopy.

The coated fibres were then used as reinforcement in cement bars as described in Example 1. The cement bars comprising coated fibres gave 21% and 22% improvement in flexural strength compared to non reinforced bars at 7$^{th}$ day maturation and 28$^{th}$ day maturation respectively. Also the cement bars comprising coated fibres gave 21% and 22% improvement in flexural strength compared to non coated fibre reinforced bars at 7$^{th}$ day maturation and 28$^{th}$ day maturation respectively.

Example 8 (Fibre Coating Comprising Cross-Linked Organosilane and Organosilicone Resin Mixture with Catalyst)

5 ml each of n-octyltriethoxy silane (Dow Corning) and hydroxyl terminated methyl silsesquioxane resin (Dow Corning) was taken in a 1000 ml beaker. To this, 1 gm of polyethylene oxide mono lauryl ether was added and diluted using water 89 ml. To the solution 0.2 gm of tetra (isopropoxy) titanate reaction product with triethanolamine in water was added and stirred well to mix. 2 gm of washed dry polyester fibres (purchased locally) were added to the solution and stirred well using magnetic stirrer. Fibres were separated by filtration and dried and the coating on the fibre was cured at 80° C. for 1 hr in an oven.

The coating on fibre was determined as 0.4% w/w with respect to the uncoated fibre weight. The presence of organosilicone in the coating was confirmed by IR spectroscopy.

The coated fibres were then used as reinforcement in cement bars as described in Example 1. The cement bars comprising coated fibres gave 21% and 22% improvement in flexural strength compared to non reinforced bars at 7$^{th}$ day maturation and 28$^{th}$ day maturation respectively. Also the cement bars comprising coated fibres gave 21% and 22% improvement in flexural strength compared to non coated fibre reinforced bars at 7$^{th}$ day maturation and 28$^{th}$ day maturation respectively.

The present invention should not be considered limited to specific examples described herein, but rather should be understood to cover all aspects of the invention. Various modifications and equivalent processes, as well as numerous structures and devices, to which the present invention may be applicable, will be readily apparent to those skilled in the art. Those skilled in the art will understand that various changes may be made without departing from the scope of the invention, which is not to be considered limited to what is described in the specification.

The invention claimed is:

1. A coated fibre comprising:
   a fibre comprising polyester, and
   a coating on the fibre, said coating comprising a cross-linked silicone prepared by cross-linking on the fibre a mixture of an organosilane and an organosilicone resin, wherein at least one of the organosilane and the organosilicone resin has at least three cross-linking groups,
   wherein said organosilicone resin is a silsesquioxane resin of general formula (2):

$$(R^3SiO_{(3-b)/2}(R^2X)_b)  \qquad (2)$$

wherein $R^3$ is independently selected from a substituted or unsubstituted organic radical, $R^2$ is a covalent bond or a divalent organic linking group, X is a cross-linking group, and b is 0, 1 or 2.

2. The coated fibre of claim 1, wherein the cross-linking groups are independently selected from one or more of hydrogen directly bonded to silicon, hydroxyl, acrylate, acyl, acyloxy, alkenyl, alkoxy, epoxy, amine, mercapto and methacrylate.

3. The coated fibre of claim 2, wherein the organosilane is of general formula (1):

$$R_{(4-a)}Si(R^1X)_a \qquad (1)$$

wherein X is a cross-linking group as already defined, $R^1$ is a covalent bond or a divalent organic linking group, R is a substituted or unsubstituted organic radical, and a is 3 or 4.

4. The coated fibre of claim 1, wherein the cross-linking is carried out in the presence of a silicone polyether.

5. The coated fibre of claim 1, wherein the organosilane is of general formula (3):

$$R_{(4-c)}Si(R^1X)_c \qquad (3)$$

wherein X is a cross-linking group independently selected from one or more of hydrogen directly bonded to silicon, hydroxyl, acrylate, acyl, acyloxy, alkenyl, alkoxy, epoxy, amine, mercapto and methacrylate, $R^1$ is a divalent organic linking group, R is a substituted or unsubstituted organic radical, and c is 2.

6. The coated fibre of claim 1, wherein the cross-linked silicone of the fibre coating comprises unreacted cross-linking groups.

7. The coated fibre of claim 1, wherein the coating on the fibre comprises from 0.05 to 2.0 weight % based on the weight of the uncoated fibre.

8. A concrete composition comprising:
   the coated fibre of claim 1;
   cement;
   water;
   aggregate; and
   optionally one or more of plasticizers, accelerators and air entraining agents.

9. A cement composition comprising:
   the coated fibre of claim 1;
   cement; and
   optionally one or more of water, aggregate, plasticizers, accelerators and air entraining agents.

10. The coated fibre of claim 1, wherein the silsesquioxane resin comprises at least 3 cross-linking groups.

11. A method of preparing a coated fibre, said method comprising at least the steps of:
    applying a coating composition in a liquid to a fibre comprising polyester, the coating composition comprising a mixture of an organosilane and an organosilicone resin, wherein at least one of the organosilane and the organosilicone resin has at least three cross-linking groups, and
    cross-linking on the fibre the coating composition including the mixture of the organosilane and the organosilicone resin to provide the coated fibre,
    wherein said organosilicone resin is a silsesquioxane resin of general formula (2):

$$(R^3SiO_{(3-b)/2}(R^2X)_b) \qquad (2)$$

wherein $R^3$ is independently selected from a substituted or unsubstituted organic radical, $R^2$ is a covalent bond or a divalent organic linking group, X is a cross-linking group, and b is 0, 1 or 2.

12. The method of claim 11, wherein the applying step comprises at least the steps of:
    mixing the fibre comprising polyester with the coating composition in the liquid, and
    removing a portion of the liquid from the fibre comprising polyester to provide a fibre comprising polyester coated with the coating composition.

13. The method of claim 11, wherein the applying step comprises spraying the coating composition in the liquid onto the fibre comprising polyester.

14. The method of claim 11, wherein the fibre comprising polyester is a plurality of fibres comprising polyester, further comprising the step of separating the fibres comprising polyester coated with the coating composition before the cross-linking step.

15. The method of claim 11, wherein the silsesquioxane resin comprises at least 3 cross-linking groups.

16. The method of claim 11, wherein the cross-linking groups are independently selected from one or more of hydrogen directly bonded to silicon, hydroxyl, acrylate, acyl, acyloxy, alkenyl, alkoxy, epoxy, amine, mercapto and methacrylate.

17. A method of preparing a concrete composition comprising at least the steps of:
    mixing the coated fibre of claim 1 with one or both of cement and aggregate to provide a mixture;
    adding water to the mixture; and
    setting the mixture.

18. The method of claim 17, further comprising one or more of the steps of:
    adding plasticizer prior to the addition of the aggregates; and
    adding air entraining agents prior to the setting of the mixture.

* * * * *